(12) United States Patent
Watanabe

(10) Patent No.: US 8,351,727 B2
(45) Date of Patent: Jan. 8, 2013

(54) IMAGE SIGNAL PROCESSING APPARATUS FOR GENERATING BRIGHT SIGNAL OF HIGH REPRODUCIBILITY

(75) Inventor: Taro Watanabe, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 1274 days.

(21) Appl. No.: 12/152,323

(22) Filed: May 14, 2008

(65) Prior Publication Data

US 2008/0298710 A1 Dec. 4, 2008

(30) Foreign Application Priority Data

May 29, 2007 (KR) .......................... 10-2007-0052179

(51) Int. Cl.
*G06K 9/40* (2006.01)
*G06K 9/38* (2006.01)

(52) U.S. Cl. ........ 382/261; 382/263; 382/264; 382/266; 382/274

(58) Field of Classification Search .......... 382/260–266, 382/274
See application file for complete search history.

(56) References Cited

U.S. PATENT DOCUMENTS 5,087,966 A * 2/1992 Harradine ..................... 348/675
7,702,175 B2 * 4/2010 Yazaki et al. .................. 382/266

FOREIGN PATENT DOCUMENTS

JP 2004-120224 A 4/2004
JP 2006-279656 A 10/2006

OTHER PUBLICATIONS

Office Action established for JP 2008-129418 (Dec. 13, 2011).

* cited by examiner

*Primary Examiner* — Wesley Tucker
(74) *Attorney, Agent, or Firm* — Drinker Biddle & Reath LLP

(57) ABSTRACT

An image signal processing apparatus and method for processing an image signal input from an analog-to-digital converter (ADC) in a pixel-by-pixel basis and generating a bright signal corresponding to chrominance signals comprise a low pass filter (LPF), an subtractor, an adder, and a bright signal controller. The LPF cancels a high frequency component of the chrominance signals contained in the input image signal. The subtractor generates a high frequency component signal by subtracting an output signal of the LPF from the input image signal. The adder generates the bright signal by adding the high frequency component signal generated by the subtractor to the output signal of the LPF. The bright signal controller increases the high frequency component signal generated by the subtractor if a pixel position of the input image signal is within an object range, and decreases the high frequency component signal generated by the subtractor if a pixel position of the input image signal is out of the object range.

20 Claims, 11 Drawing Sheets

IMAGE SIGNAL PROCESSING APPARATUS FOR GENERATING BRIGHT SIGNAL OF HIGH REPRODUCIBILITY

CROSS-REFERENCE TO RELATED PATENT APPLICATION

This application claims the benefit of Korean Patent Application No. 10-2007-0052179, filed on May 29, 2007, in the Korean Intellectual Property Office, the entire content of which is incorporated herein by reference.

BACKGROUND OF THE INVENTION

1. Field of the Invention

The present invention relates to an image signal processing apparatus, and more particularly, to an image signal processing apparatus for generating a bright signal corresponding to chrominance signals by processing an image signal input from an analog-to-digital converter in a pixel-by-pixel basis.

2. Description of the Related Art

FIG. 1 illustrates an arrangement structure of color filters attached to charge-coupled devices (CCDs) in a digital camera that is a typical image signal processing apparatus. FIG. 2 illustrates a basic configuration of a typical image signal processing apparatus, e.g., a digital camera disclosed in U.S. Pat. Publication No. 2007-0174780. FIG. 3 illustrates a configuration of an image signal periodically output to a DB line from an analog-to-digital converter (ADC) illustrated in FIG. 2. FIG. 4 illustrates a configuration of an image signal periodically output to a DR line from the ADC illustrated in FIG. 2.

In FIG. 2, reference characters $S_{B1}, S_{B2}, \ldots, S_{Bm}$ denote signals input from the CCDs to the ADC via DB lines, reference characters $S_{R1}, S_{R2}, \ldots, S_{Rm}$ denote signals input from the CCDs to the ADC via DR lines, and reference characters $D_{B1}, D_{B2}, \ldots, D_{Bm}$ denote signals input from the ADC to the image signal processing apparatus via DB lines. Also, reference characters $D_{R1}, D_{R2}, \ldots, D_{Rm}$ denote signals input from the ADC to the image signal processing apparatus via DR lines, reference characters $(R-Y)_1, (B-Y)_1, \ldots, (R-Y)_{2m}, (B-Y)_{2m}$ denote chrominance signals output from the image signal processing apparatus, and reference characters $YL_1, \ldots, YL_{2m}$ denote chrominance signals output from the image signal processing apparatus.

In FIG. 1, Magenta (Mg), Cyan (Cy), Green (G), and Yellow (Ye) on the top are for DB lines, and G, Cy, Mg, and Ye on the bottom are for DR lines. A signal $D_{Bm}$ output from the ADC to an $m^{th}$ DB line corresponds to Mg+Cy in an oddth horizontal period and G+Ye in an eventh horizontal period (referring to FIG. 3). Thus, in the image signal processing apparatus, a signal $D_{Bm}(n)$ corresponding to an $m^{th}$ DB line in an $n^{th}$ horizontal period is finally obtained by using Equation 1.

$$D_{Bm}(n)=Mg+Cy-(G+Ye) \quad \text{(Equation 1)}$$

In Equation 1, when n is an odd number, Mg+Cy denotes a signal applied to the $m^{th}$ DB line in the $n^{th}$ horizontal period, and G+Ye denotes a signal applied to the $m^{th}$ DB line in an $(n+1)^{th}$ horizontal period. When n is an even number, G+Ye denotes a signal applied to the $m^{th}$ DB line in the $n^{th}$ horizontal period, and Mg+Cy denotes a signal applied to the $m^{th}$ DB line in the $(n+1)^{th}$ horizontal period. For the reference, in terms of color, since Mg=R (Red)+B (Blue) and Cy=B+G, Equation 1 turns out 2B-G.

A signal $D_{Rm}$ output from the ADC to an $m^{th}$ DR line corresponds to G+Cy in an oddth horizontal period and Mg+Ye in an eventh horizontal period (referring to FIG. 4). Thus, in the image signal processing apparatus, a signal $D_{Rm}(n)$ corresponding to an $m^{th}$ DR line in an $n^{th}$ horizontal period is finally obtained by using Equation 2.

$$D_{Rm}(n)=Mg+Ye-(G+Cy)=2R-G \quad \text{(Equation 2)}$$

In Equation 2, when n is an odd number, G+Cy denotes a signal applied to the $m^{th}$ DR line in the $n^{th}$ horizontal period, and Mg+Ye denotes a signal applied to the $m^{th}$ DR line in an $(n+1)^{th}$ horizontal period. When n is an even number, Mg+Ye denotes a signal applied to the $m^{th}$ DR line in the $n^{th}$ horizontal period, and G+Cy denotes a signal applied to the $m^{th}$ DR line in the $(n+1)^{th}$ horizontal period. For the reference, in terms of color, since Mg=R+B and Cy=B+G, Equation 2 turns out 2R-G.

The input image signals $D_{B1}, D_{B2}, \ldots, D_{Bm}$ are processed as described above, since pixel image signals $D_{B1}, D_{B2}, \ldots, D_{Bm}$ from the ADC overlap through two horizontal periods (sampling periods). Thus, if it is assumed that a horizontal frequency (a sampling frequency) is fs, as illustrated in FIG. 5, in an input image signal $D_B(n)$ or $D_R(n)$, an normal component of a bright signal YL(n) overlaps with a high frequency component that is a carrier frequency of a chrominance signal (R-Y)(n) or (B-Y)(n). The image signal processing apparatus uses a low pass filter (LPF) having characteristics of a first curve $C_1$ illustrated in FIG. 6 in order to cancel a high frequency component of the chrominance signals (R-Y)(n) and (B-Y)(n) in a process of generating the bright signal YL(n) corresponding to the chrominance signals (R-Y)(n) and (B-Y)(n). In addition, the image signal processing apparatus uses an LPF having characteristics of a second curve $C_2$ illustrated in FIG. 6 in order to cancel a high frequency component of a chrominance signal (R-Y)(n) or (B-Y)(n) in a process of obtaining the chrominance signal (R-Y)(n) or (B-Y)(n).

FIG. 7 illustrates an object image of a frame (FR) formed with the input image signals $D_{B1}, D_{R1}, \ldots, D_{Bm},$ and $D_{Rm}$ of the image signal processing apparatus illustrated in FIG. 2. Referring to FIG. 7, if it is assumed that only a single object exists, a range of the object is determined by a horizontal width $W_H$ and a vertical width $W_V$.

As described above, saturation is relatively high in an object area not a background area. Accordingly, a normal high frequency component exists in a bright signal.

Nonetheless, according to a conventional image signal processing apparatus, in order to cancel a high frequency component of chrominance signals in a process of generating a bright signal, all of input image signals $D_{B1}, D_{R1}, \ldots, D_{Bm},$ and $D_{Rm}$ pass through an LPF (referring to $C_1$ of FIG. 6). That is, low pass filtering is performed for all areas of a frame FR in the process of generating a bright signal.

Accordingly, since a high frequency component of the bright signal existing in an object area is canceled in the process of generating the bright signal, image reproducibility is degraded.

SUMMARY OF THE INVENTION

The present invention provides an image signal processing apparatus for enhancing image reproducibility.

Accordingly, an embodiment of the present invention provides an image signal processing apparatus for processing an image signal input from an analog-to-digital converter (ADC) in a pixel-by-pixel basis and generating a bright signal corresponding to chrominance signals. The image signal processing apparatus comprises a low pass filter (LPF), an subtractor, an adder, and a bright signal controller.

The LPF cancels a high frequency component of the chrominance signals contained in the input image signal. The subtractor generates a high frequency component signal by subtracting an output signal of the LPF from the input image signal. The adder generates the bright signal by adding the high frequency component signal generated by the subtractor to the output signal of the LPF. The bright signal controller increases the high frequency component signal generated by the subtractor if a pixel position of the input image signal is within an object range, and decreases the high frequency component signal generated by the subtractor if a pixel position of the input image signal is out of the object range.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, embodiments of the present invention will be described with reference to the attached drawings.

Figure 1:
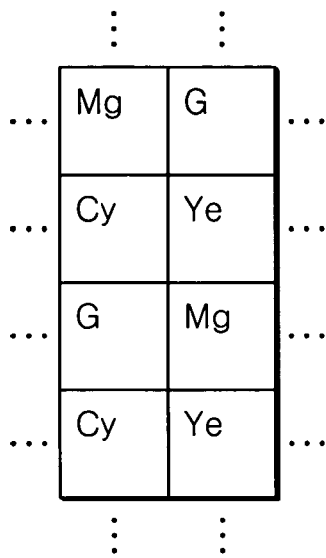
FIG. 1 illustrates an arrangement structure of color filters attached to charge-coupled devices (CCDs) in a typical digital camera.
Figure 2:
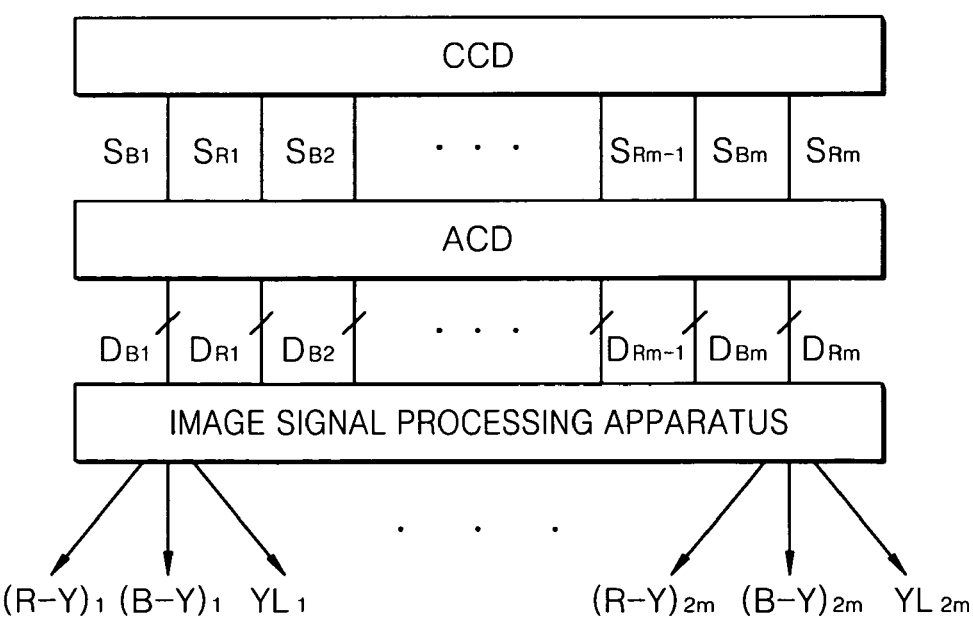
FIG. 2 illustrates a basic configuration of a typical digital camera.
Figure 3:
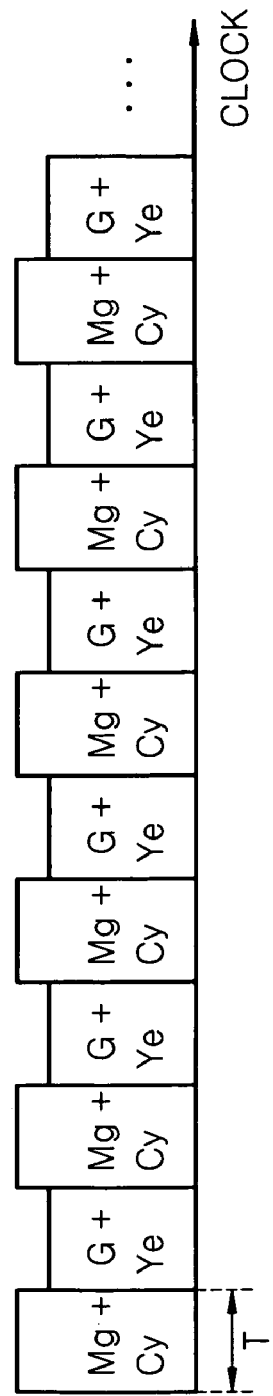
FIG. 3 illustrates a configuration of an image signal periodically output to a DB line from an analog-to-digital converter (ADC) illustrated in FIG. 2.
Figure 4:
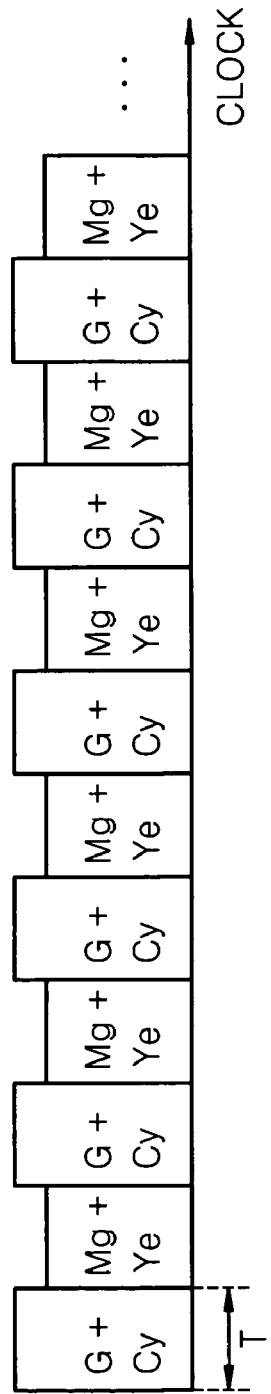
FIG. 4 illustrates a configuration of an image signal periodically output to a DR line from the ADC illustrated in FIG. 2.
Figure 5:
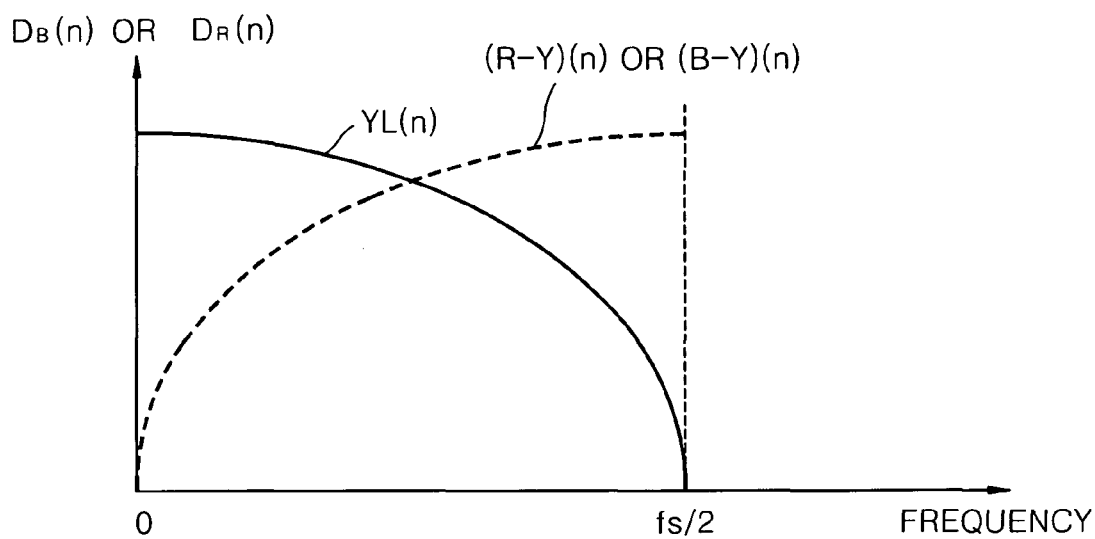
FIG. 5 illustrates a frequency characteristic of an image signal periodically output to a DR or DB line from the ADC illustrated in FIG. 2.
Figure 6:
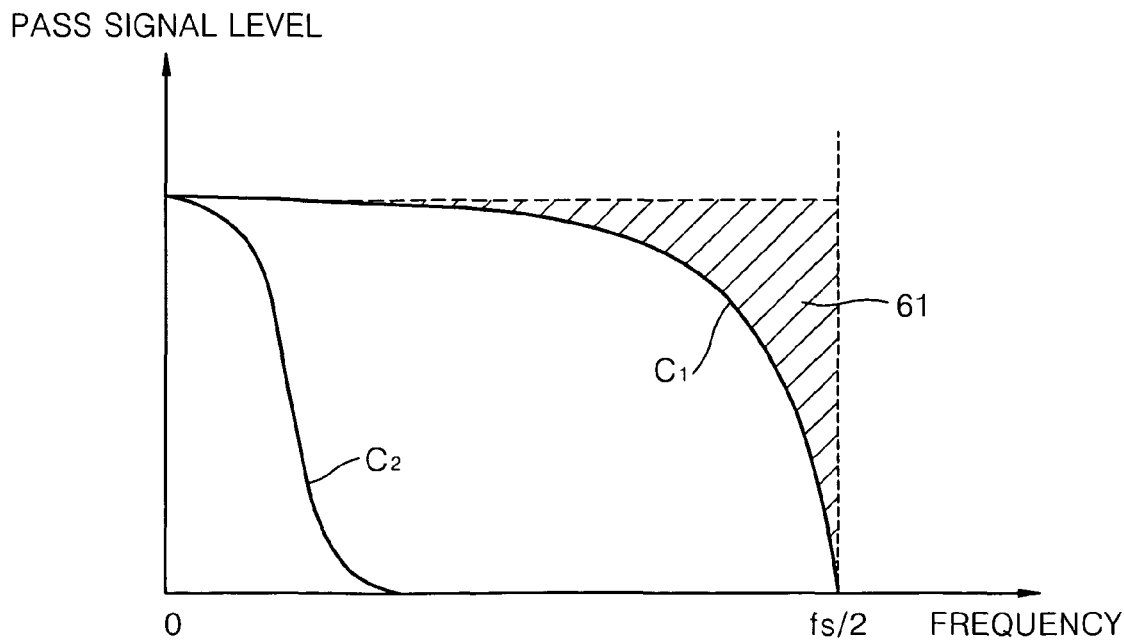
FIG. 6 illustrates characteristics of low pass filters (LPFs) applied to chrominance signals and a bright signal contained in an input image signal in an image signal processing apparatus illustrated in FIG. 2.
Figure 8:
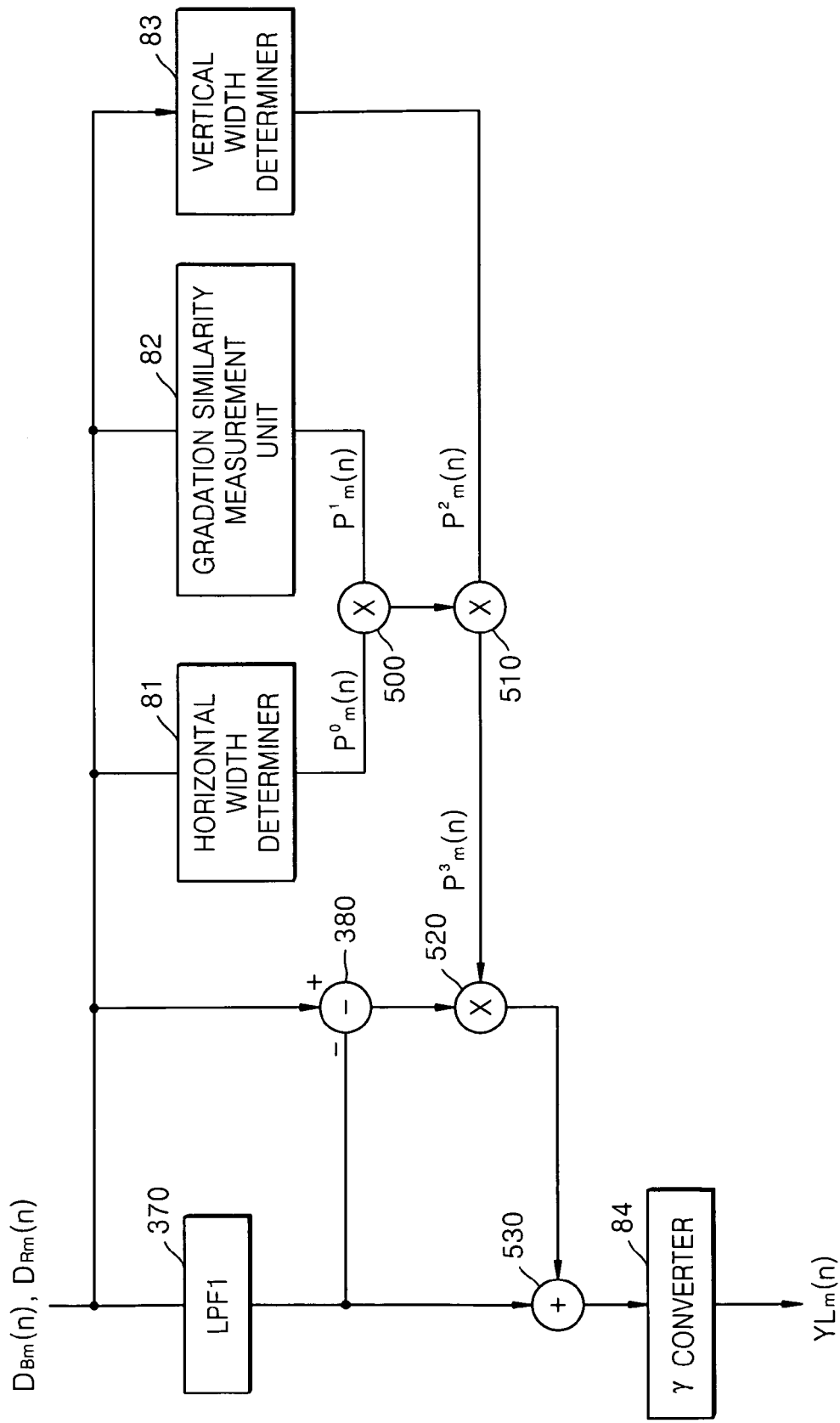
FIG. 8 is a block diagram of an example of an image signal processing apparatus according to an embodiment of the present invention.

FIG. 8 is a block diagram of an example of an image signal processing apparatus according to an embodiment of the present invention. In FIG. 8, reference character $D_{Bm}(n)$ denotes an image signal applied to an $m^{th}$ DB line in an $n^{th}$ horizontal period, and reference character $D_{Rm}(n)$ denotes an image signal applied to an $m^{th}$ DR line in the $n^{th}$ horizontal period. Referring to FIGS. 2 and 8, the image signal processing apparatus according to this embodiment of the present invention generates a bright signal $YL_m(n)$ corresponding to chrominance signals by processing an image signal $D_{Bm}(n)$ or $D_{Rm}(n)$ input from an analog-to-digital converter (ADC) in a pixel-by-pixel basis and includes a low pass filter (LPF1) 370, a subtractor 380, an adder 530, and a bright signal controller (81, 82, 500, 83, 510, and 520).

The LPF1 370 cancels an abnormal high frequency component of chrominance signals included in the input image signal $D_{Bm}(n)$ or $D_{Rm}(n)$. The subtractor 380 generates a high frequency component signal by subtracting an output signal of the LPF1 370 from the input image signal $D_{Bm}(n)$ or $D_{Rm}(n)$. The adder 530 generates the bright signal $YL_m(n)$ by adding the high frequency component signal generated by the subtractor 380 to the output signal of the LPF1 370.

Figure 7:
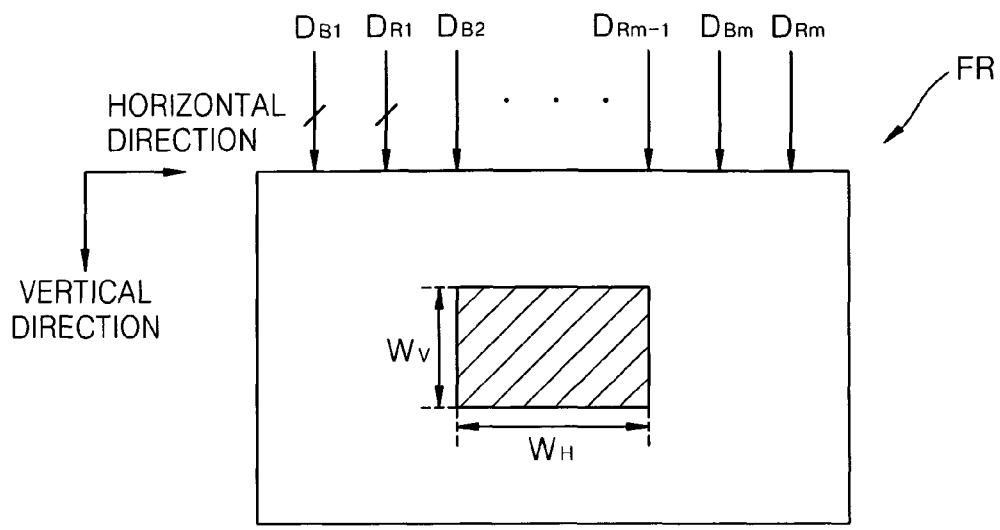
FIG. 7 illustrates an object image of a frame (FR) formed with input image signals of the image signal processing apparatus illustrated in FIG. 2.

The bright signal controller (81, 82, 500, 83, 510, and 520) increases the high frequency component signal generated by the subtractor 380 if a pixel position of the input image signal $D_{Bm}(n)$ or $D_{Rm}(n)$ is within an object range (Referring to FIG. 7), and decreases the high frequency component signal generated by the subtractor 380 if a pixel position of the input image signal $D_{Bm}(n)$ or $D_{Rm}(n)$ is out of the object range. If a pixel position of the input image signal $D_{Bm}(n)$ or $D_{Rm}(n)$ is within the object range, a normal high frequency component is contained in the bright signal $YL_m(n)$ of the input image signal $D_{Bm}(n)$ or $D_{Rm}(n)$. This normal high frequency component is canceled together with an abnormal high frequency component of chrominance signals by the LPF1 370. However, this canceled normal high frequency component of the bright signal $YL_m(n)$ is compensated by the bright signal controller (81, 82, 500, 83, 510, and 520).

Thus, according to the image signal processing apparatus according to this embodiment of the present invention, regardless of cancelling the abnormal high frequency component of the chrominance signals in the LPF1 370, the normal high frequency component of the bright signal $YL_m(n)$ generated within the object range can be preserved. Hence, image reproducibility can be enhanced.

A gamma converter 84 performs gamma conversion of the bright signal $YL_m(n)$ output from the adder 530 in order to previously compensate for an inverse gamma bright characteristic of a cathode ray tube. The bright signal controller (81, 82, 500, 83, 510, and 520) includes a horizontal width determiner 81, a gradation similarity measurement unit 82, a first multiplier 500, a vertical width determiner 83, a second multiplier 510, and a third multiplier 520. The horizontal width determiner 81 outputs a horizontal width determination signal $P_m^0(n)$, which is a binary signal "1" if a pixel position of the input image signal $D_{Bm}(n)$ or $D_{Rm}(n)$ is within a horizontal object width ($W_H$ of FIG. 7) otherwise a binary signal "0".

The gradation similarity measurement unit 82 generates a gradation similarity signal $P_m^1(n)$, which is a ratio of a gradation of the input image signal $D_{Bm}(n)$ or $D_{Rm}(n)$ approximate to a mean gradation in a horizontal direction. As the gradation of the input image signal $D_{Bm}(n)$ or $D_{Rm}(n)$ is approximate to the mean gradation in the horizontal direction, the probability that a pixel position of the input image signal $D_{Bm}(n)$ or $D_{Rm}(n)$ is within the horizontal object width ($W_H$ of FIG. 7) is high.

The first multiplier 500 multiplies the horizontal width determination signal $P_m^0(n)$ output from the horizontal width determiner 81 by the gradation similarity signal $P_m^1(n)$ output from the gradation similarity measurement unit 82. The vertical width determiner 83 outputs a vertical width determination signal $P_m^2(n)$, which is a binary signal "1" if a pixel position of the input image signal $D_{Bm}(n)$ or $D_{Rm}(n)$ is within a vertical object width ($W_V$ of FIG. 7) otherwise a binary signal "0".

The second multiplier 510 multiplies a signal output from the first multiplier 500 by the vertical width determination signal $P_m^2(n)$ output from the vertical width determiner 83. The third multiplier 520 multiplies the high frequency component signal output from the subtractor 380 by a signal $P_m^3(n)$ output from the second multiplier 510 and outputs a high frequency component signal that is the multiplication result to the adder 530.

Figure 9:
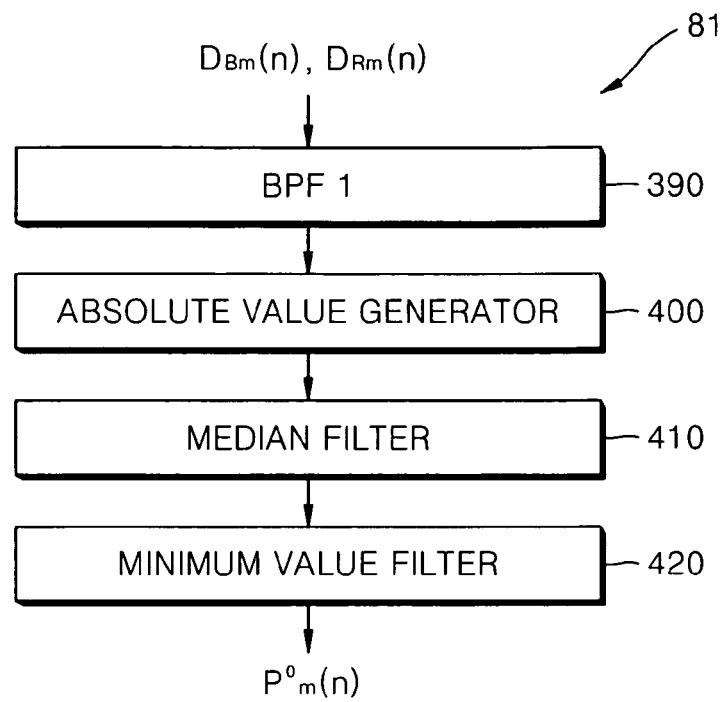
FIG. 9 is a block diagram of an example of a horizontal width determiner illustrated in FIG. 8.
Figure 10:
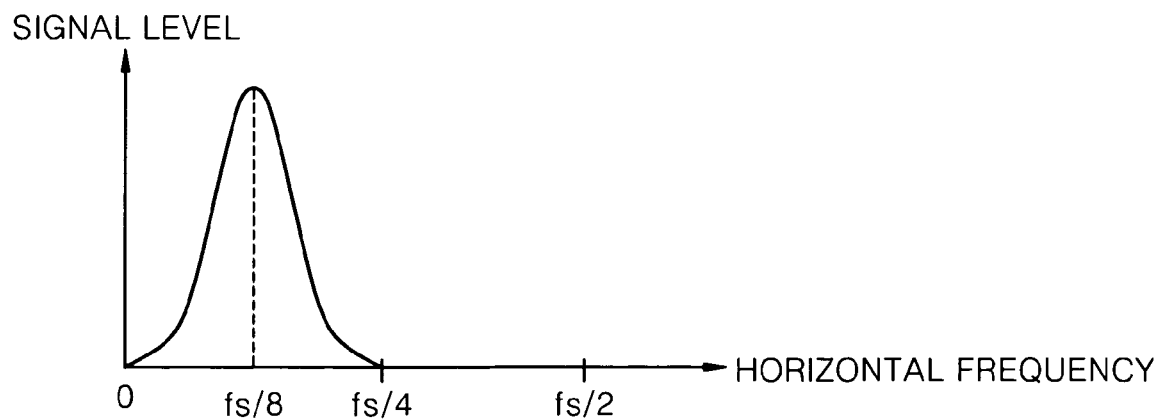
FIG. 10 illustrates characteristics of an example of a band pass filter (BPF1) illustrated in FIG. 9.
Figure 11:
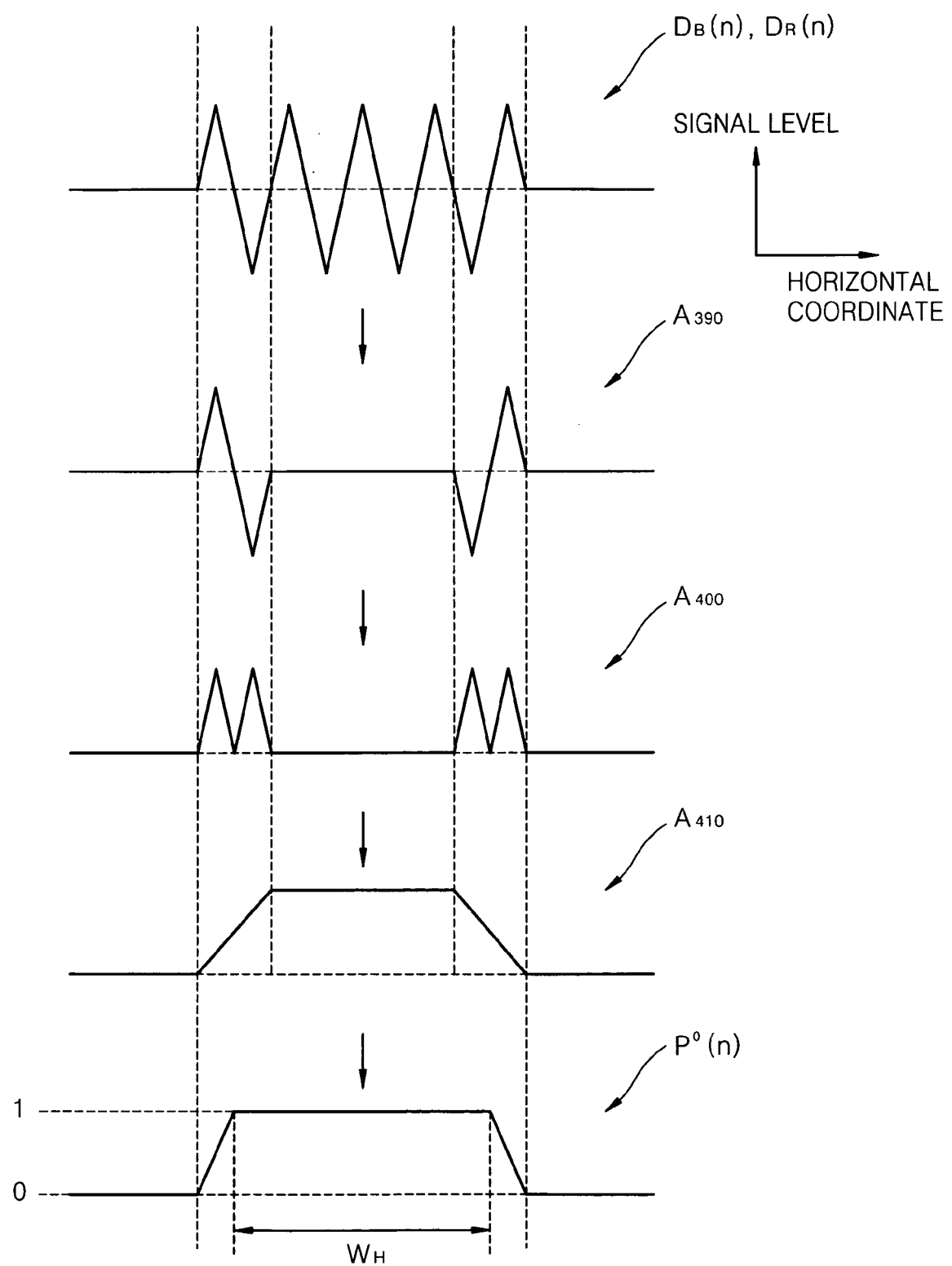
FIG. 11 illustrates characteristics of an example of components of the horizontal width determiner illustrated in FIG. 9.

FIG. 9 is a block diagram of an example of the horizontal width determiner 81 illustrated in FIG. 8. FIG. 10 illustrates an example of characteristics of a band pass filter (BPF1) 390 illustrated in FIG. 9. In FIG. 10, reference character fs denotes a horizontal frequency (sampling frequency). FIG. 11 illustrates an example of characteristics of components of the horizontal width determiner 81 illustrated in FIG. 9. In FIGS. 9 and 11, reference character $D_{Bm}(n)$ or $D_{Rm}(n)$ denotes an input image signal, $A_{390}$ denotes an operational characteristic of the BPF1 390, $A_{400}$ denotes an operational characteristic of an absolute value generator 400, $A_{410}$ denotes an operational characteristic of a median filter 410, $P_m^0(n)$ denotes a horizontal width determination signal corresponding to an $m^{th}$ line in an $n^{th}$ horizontal period, and $P^0(n)$ denotes a horizontal width determination signal for all pixels in the $n^{th}$ horizontal period.

Referring to FIGS. 9 through 11, the horizontal width determiner 81 includes the BPF1 390, the absolute value generator 400, the median filter 410, and a minimum value filter 420. Two edges in the horizontal direction are detected by the BPF1 390 having the operational characteristic illustrated in FIG. 10 (referring to $A_{390}$). The absolute value generator 400 generates an absolute value of an output of the BPF1 390 (referring to a characteristic waveform of $A_{400}$).

The median filter 410 outputs a binary signal "1" if an absolute value of the input image signal $D_{Bm}(n)$ or $D_{Rm}(n)$ is between the two edges in the horizontal direction, otherwise outputs a binary signal "0" (referring to a characteristic waveform of $A_{410}$). As well known, in an operation of the median filter 410, a gradation value of each pixel is converted to a median value of gradation values of surrounding pixels. The minimum value filter 420 has a characteristic for reducing a horizontal area occupied by each of the two edges of the median filter 410 (referring to a characteristic waveform of $P^0(n)$).

Figure 12:
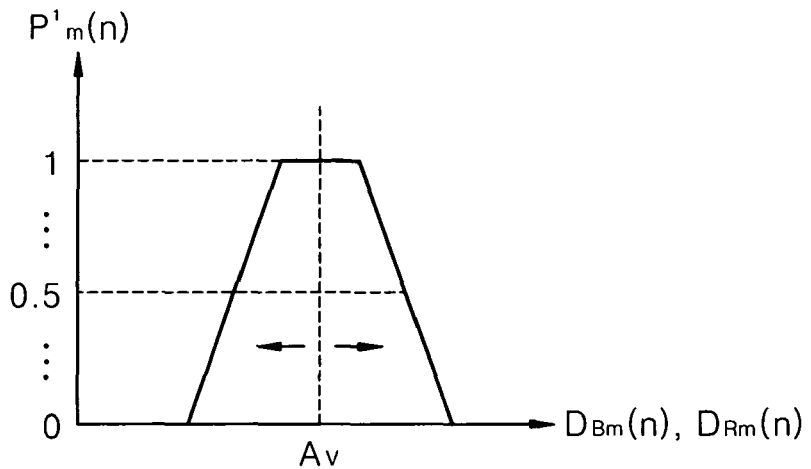
FIG. 12 illustrates characteristics of an example of a gradation similarity measurement unit illustrated in FIG. 8.

FIG. 12 illustrates an example of characteristics of the gradation similarity measurement unit 82 illustrated in FIG. 8. Referring to FIG. 12, the gradation similarity measurement unit 82 generates the gradation similarity signal $P_m^1(n)$, which is a ratio of a gradation of the input image signal $D_{Bm}(n)$ or $D_{Rm}(n)$ approximate to a mean gradation $A_V$ in the horizontal direction, wherein the gradation similarity signal $P_m^1(n)$ has a value between 0 and 1. As described above, as the gradation of the input image signal $D_{Bm}(n)$ or $D_{Rm}(n)$ is approximate to the mean gradation $A_V$ in the horizontal direction, the probability that a pixel position of the input image signal $D_{Bm}(n)$ or $D_{Rm}(n)$ is within the horizontal object width ($W_H$ of FIG. 7) is high.

Figure 13:
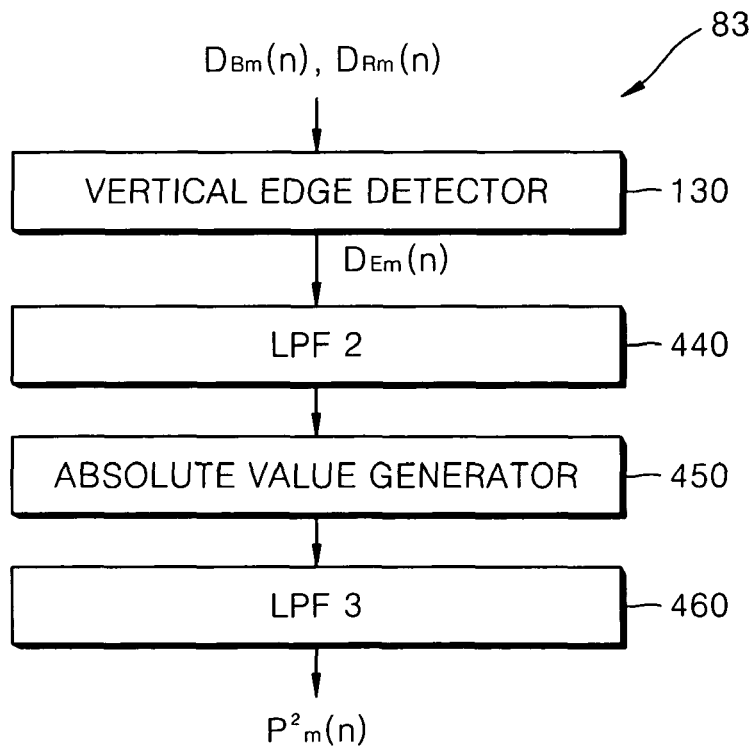
FIG. 13 is a block diagram of an example of a vertical width determiner illustrated in FIG. 8.
Figure 14:
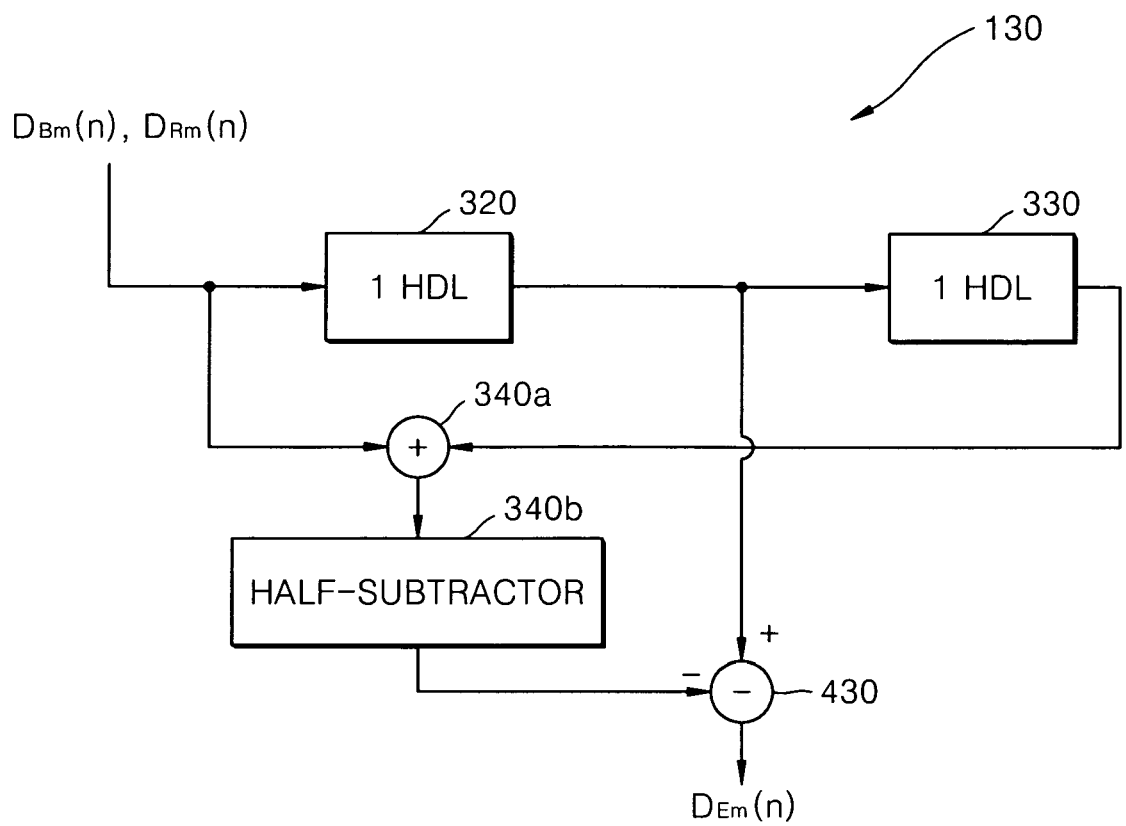
FIG. 14 is a block diagram of an example of a vertical edge detector illustrated in FIG. 13.
Figure 15:
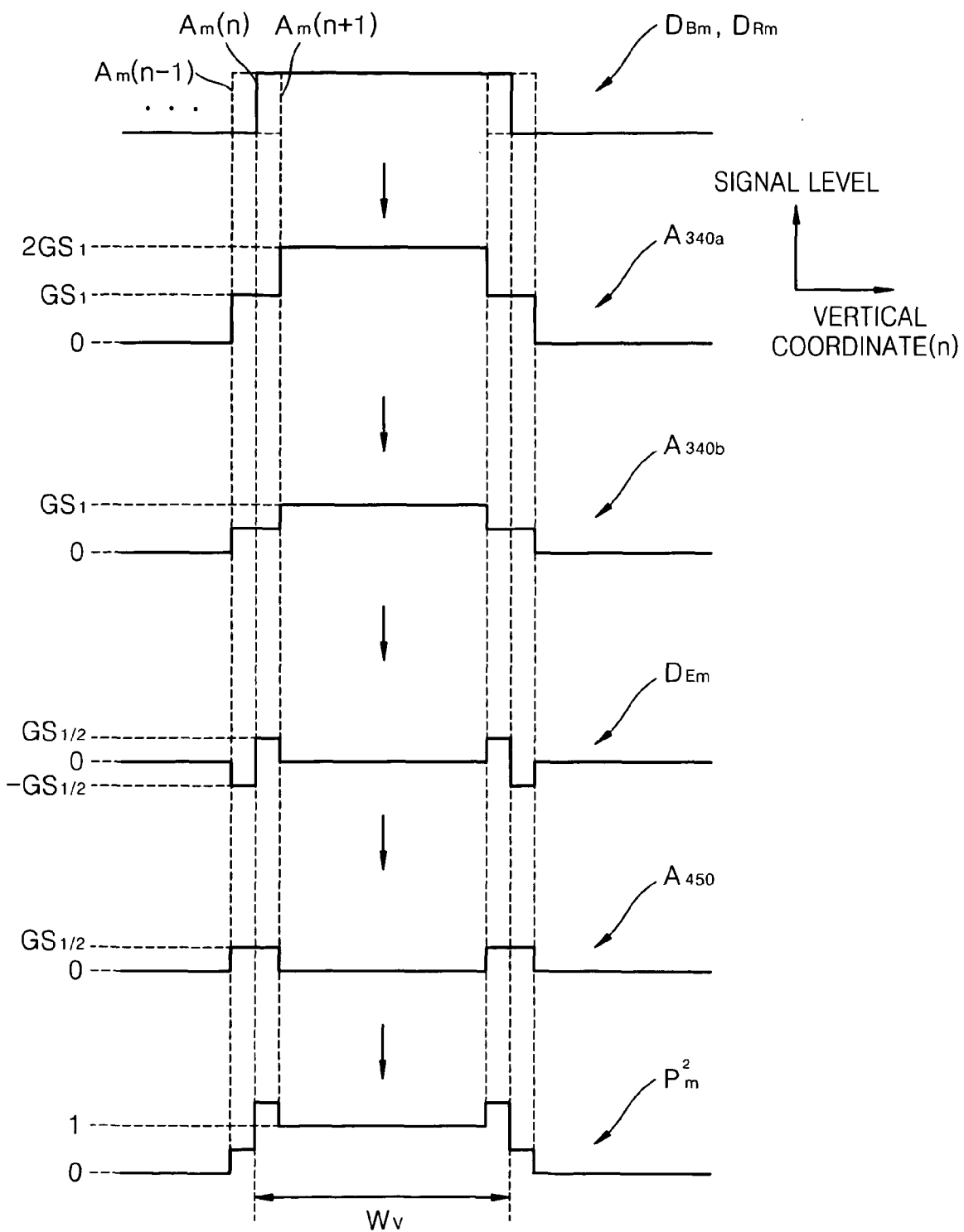
FIG. 15 illustrates characteristics of an example of components of the vertical width determiner illustrated in FIG. 13.

FIG. 13 is a block diagram of an example of the vertical width determiner 83 illustrated in FIG. 8. FIG. 14 is a block diagram of an example of a vertical edge detector 130 illustrated in FIG. 13. FIG. 15 illustrates an example of characteristics of components of the vertical width determiner 83 illustrated in FIG. 13.

In FIG. 15, reference character $D_{Bm}$ denotes an input image signal applied to an $m^{th}$ DB line, $D_{Rm}$ denotes an input image signal applied to an $m^{th}$ DR line, reference character $A_m(n-1)$ denotes an input image signal applied to an $m^{th}$ DB line or $m^{th}$ DR line in an $(n-1)^{th}$ horizontal period, reference character $A_m(n)$ denotes an input image signal applied to the $m^{th}$ DB or DR line in the $n^{th}$ horizontal period, and $A_m(n+1)$ denotes an input image signal applied to an $m^{th}$ DB or DR line in the $(n+1)^{th}$ horizontal period. Also in FIG. 15, it is assumed that the input image signals $A_m(n-1)$, $A_m(n)$, and $A_m(n+1)$ have a gradation of GS1. That is, it is assumed in the input image signal $D_{Bm}$ or $D_{Rm}$ that an object vertical width is $W_V$ in terms of the $m^{th}$ DB line or the $m^{th}$ DR line.

Referring to FIGS. 13 through 15, the vertical width determiner 83 includes the vertical edge detector 130, a second LPF (LPF2) 440, an absolute value generator 450, and a third LPF (LPF3) 460. The vertical edge detector 130 detecting two edges in the vertical direction includes a first delayer (1HDL) 320, a second delayer (1HDL) 330, an adder 340a, a half-subtractor 340b, and a subtractor 430. The first delayer (1HDL) 320 and the second delayer (1HDL) 330 are used to generate input image signals $D_{Bm}(n-1)$, $D_{Rm}(n-1)$, $D_{Bm}(n+1)$, and $D_{Rm}(n+1)$ of a first adjacent pixel and a second adjacent pixel located at both edges of a pixel of the input image signal $D_{Bm}(n)$ or $D_{Rm}(n)$.

The adder 340a adds the input image signals of the first adjacent pixel and the second adjacent pixel located at the both edges of the pixel of the input image signal $D_{Bm}(n)$ or $D_{Rm}(n)$ in the vertical direction (referring to a characteristic waveform of $A_{340a}$). The half-subtractor 340b subtracts an output of the adder 340a to a half (referring to a characteristic waveform of $A_{340b}$). The subtractor 430 finally generates an output $D_{Em}$ of the vertical edge detector 130 by subtracting an output of the half-subtractor 340b from the input image signal $D_{Bm}(n)$ or $D_{Rm}(n)$ (referring to a characteristic waveform of $D_{Em}$). The output $D_{Em}$ of the vertical edge detector 130 is input to the LPF2 440.

The LPF2 440 cancels a high frequency component of chrominance signals contained in the input image signal $D_{Em}$ from the vertical edge detector 130. The absolute value generator 450 generates an absolute value of an output of the LPF2 440 (referring to a characteristic waveform of $A_{450}$). The LPF3 460 outputs a vertical width determination signal $P_m^2$ according to the characteristic waveform of $A_{450}$, that is, a binary signal "1" is output if the absolute value of the output of the absolute value generator 450 is between the two edges in the vertical direction, otherwise a binary signal "0" is output (referring to a characteristic waveform of $P_m^2$).

Figure 16:
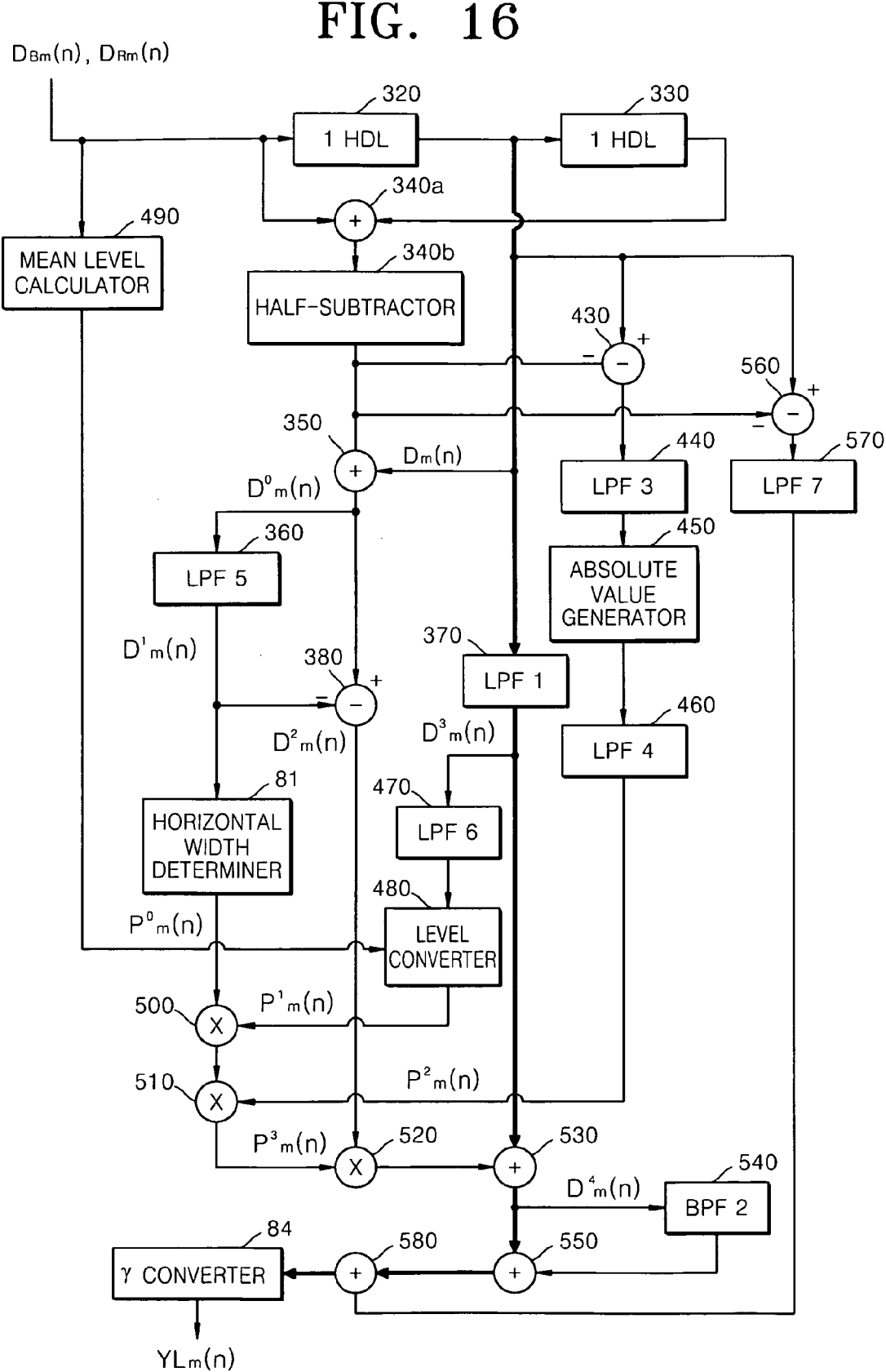
FIG. 16 is a block diagram of an example of an image signal processing apparatus according to another embodiment of the present invention.

FIG. 16 is a block diagram of an example of an image signal processing apparatus according to another embodiment of the present invention. Referring to FIG. 16, the image signal processing apparatus according to this embodiment of the present invention generates a bright signal $YL_m(n)$ corresponding to chrominance signals by processing an image signal $D_{Bm}(n)$ or $D_{Rm}(n)$ input from an analog-to-digital converter (ADC) in a pixel-by-pixel basis and includes a first LPF (LPF1) 370, a second LPF (320, 330, 340a, 340b, and 350), a fifth LPF (LPF5) 360, a first subtractor 380, a first adder 530, and a bright signal controller (81, 470, 480, 490, 500, 320, 330, 340a, 340b, 430, 440, 450, 460, 510, and 520). The LPF1 370 cancels an abnormal frequency component of chrominance signals included in the input image signal $D_{Bm}(n)$ or $D_{Rm}(n)$. The second LPF (320, 330, 340a, 340b, and 350)

cancels a high frequency component of the input image signal $D_{Bm}(n)$ or $D_{Rm}(n)$ in the vertical direction. The LPF5 360 cancels a high frequency component of chrominance signals contained in a signal $D_m^0(n)$ output from the second LPF (320, 330, 340a, 340b, and 350).

The first subtractor 380 generates a high frequency component signal $D_m^2(n)$ by subtracting an output signal $D_m^1(n)$ of the LPF5 360 from the signal $D_m^0(n)$ output from the second LPF (320, 330, 340a, 340b, and 350). The first adder 530 generates the bright signal $YL_m(n)$ by adding the high frequency component signal $D_m^2(n)$ generated by the first subtractor 380 to an output signal $D_m^3(n)$ of the LPF1 370. The bright signal controller (81, 470, 480, 490, 500, 320, 330, 340a, 340b, 430, 440, 450, 460, 510, and 520) increases the high frequency component signal $D_m^2(n)$ generated by the first subtractor 380 if a pixel position of the input image signal $D_{Bm}(n)$ or $D_{Rm}(n)$ is within an object range, and decreases the high frequency component signal $D_m^2(n)$ generated by the first subtractor 380 if a pixel position of the input image signal $D_{Bm}(n)$ or $D_{Rm}(n)$ is out of the object range.

As described above, if a pixel position of the input image signal $D_{Bm}(n)$ or $D_{Rm}(n)$ is within the object range, a normal high frequency component is contained in the bright signal $YL_m(n)$ of the input image signal $D_{Bm}(n)$ or $D_{Rm}(n)$. This normal high frequency component is canceled together with an abnormal high frequency component of chrominance signals by the LPF1 370. However, this canceled normal high frequency component of the bright signal $YL_m(n)$ is compensated by the bright signal controller (81, 470, 480, 490, 500, 320, 330, 340a, 340b, 430, 440, 450, 460, 510, and 520).

Thus, according to the image signal processing apparatus employed by this embodiment of the present invention, regardless of cancelling the abnormal high frequency component of the chrominance signals in the LPF1 370, the normal high frequency component of the bright signal $YL_m(n)$ generated within the object range can be preserved. Thus, image reproducibility can be enhanced. A gamma converter 84 performs gamma conversion of a bright signal $D_m^4(n)$ output from the first adder 530 in order to previously compensate for an inverse gamma bright characteristic of a cathode ray tube. The bright signal controller (81, 470, 480, 490, 500, 320, 330, 340a, 340b, 430, 440, 450, 460, 510, and 520) includes a horizontal width determiner 81, a gradation similarity measurement unit (470, 480, and 490), a first multiplier 500, a vertical width determiner (320, 330, 340a, 340b, 430, 440, 450, 460, and 510), a second multiplier 510, and a third multiplier 520.

The horizontal width determiner 81 outputs a binary signal "1" if a pixel position of the input image signal $D_{Bm}(n)$ or $D_{Rm}(n)$ is within a horizontal object width, otherwise outputs a binary signal "0". The gradation similarity measurement unit (470, 480, and 490) generates a gradation similarity signal $P_m^1(n)$, which is a ratio of a gradation of the input image signal $D_{Bm}(n)$ or $D_{Rm}(n)$ approximate to a mean gradation in the horizontal direction. The first multiplier 500 multiplies an output signal of the horizontal width determiner 81 by the gradation similarity signal $P_m^1(n)$ output from the gradation similarity measurement unit (470, 480, and 490). The vertical width determiner (320, 330, 340a, 340b, 430, 440, 450, 460, and 510) outputs a binary signal "1" if a pixel position of the input image signal $D_{Bm}(n)$ or $D_{Rm}(n)$ is within a vertical object width, otherwise outputs a binary signal "0".

The second multiplier 510 multiplies a signal output from the first multiplier 500 by an output signal $P_m^2(n)$ of the vertical width determiner (320, 330, 340a, 340b, 430, 440, 450, 460, and 510). The third multiplier 520 multiplies the high frequency component signal $D_m^2(n)$ output from the first subtractor 380 by a signal $P_m^3(n)$ output from the second multiplier 510 and outputs a high frequency component signal that is the multiplication result to the first adder 530.

In the bright signal controller (81, 470, 480, 490, 500, 320, 330, 340a, 340b, 430, 440, 450, 460, 510, and 520), the horizontal width determiner 81 includes a BPF (390 of FIG. 9), an absolute value generator (400 of FIG. 9), a median filter (410 of FIG. 9), and a minimum value filter (420 of FIG. 9). That is, since the configuration and operation of the horizontal width determiner 81 are the same as those of the horizontal width determiner 81 according to this embodiment of the present invention, description of the horizontal width determiner 81 is omitted.

The gradation similarity measurement unit (470, 480, and 490) includes a sixth LPF (LPF6) 470, a mean level calculator 490, and a level converter 480. The LPF6 470 cancels the high frequency component of the chrominance signals contained in the output signal $D_m^3(n)$ of the LPF1 370. The mean level calculator 490 calculates a mean gradation of the pixel position of the input image signal $D_{Bm}(n)$ or $D_{Rm}(n)$ in the horizontal direction. The level converter 480 generates a gradation similarity signal $P_m^1(n)$, which is a ratio of a gradation output from the LPF6 470 approximate to the mean gradation output from the mean level calculator 490 (referring to FIG. 12).

The vertical width determiner (320, 330, 340a, 340b, 430, 440, 450, 460, and 510) includes a vertical edge detector (320, 330, 340a, 340b, and 430), a third LPF (LPF3) 440, an absolute value generator 450, and a fourth LPF (LPF4) 460. The vertical edge detector (320, 330, 340a, 340b, and 430) detecting two edges in the vertical direction has the same operational characteristic as that of the vertical edge detector 130 according to the embodiment of the present invention discussed above with regard to FIG. 13.

The LPF3 440 cancels the high frequency component of the chrominance signals contained in an output signal of the vertical edge detector (320, 330, 340a, 340b, and 430). The LPF3 440 has the same operational characteristic as that of the LPF2 440 according to the embodiment of the present invention discussed above with regard to FIG. 13.

The absolute value generator 450 generating an absolute value of an output of the LPF3 440 has the same operational characteristic as that of the absolute value generator 450 according to the embodiment of the present invention discussed above. The LPF4 460 outputs a binary signal "1" if the absolute value generated by the absolute value generator 450 is within the two edges in the vertical direction, otherwise outputs a binary signal "0". The LPF4 460 has the same operational characteristic as that of the LPF3 460 according to the embodiment of the present invention discussed above with regard to FIG. 13. In particular, the vertical edge detector (320, 330, 340a, 340b, and 430) includes a first delayer (1HDL) 320, a second delayer (1HDL) 330, a second adder 340a, a half-subtractor 340b, and a second subtractor 430.

The first delayer (1HDL) 320 and the second delayer (1HDL) 330 are used to generate input image signals of a first adjacent pixel and a second adjacent pixel located at both edges of a pixel of the input image signal $D_{Bm}(n)$ or $D_{Rm}(n)$ in the vertical direction. The first delayer (1HDL) 320 and the second delayer (1HDL) 330 have the same operational characteristics as those of the first delayer (1HDL) 320 and the second delayer (1HDL) 330 according to this embodiment of the present invention (referring to FIG. 14).

The second adder 340a adds the input image signals of the first adjacent pixel and the second adjacent pixel. The second adder 340a has the same operational characteristic as that of the adder 340a according to the embodiment of the present invention discussed above with regard to FIG. 14.

The half-subtractor 340b subtracting an output of the adder 340a to a half has the same operational characteristic as that of the half-subtractor 340b according to the embodiment of the present invention discussed above with regard to FIG. 14. The second subtractor 430 subtracting an output of the half-subtractor 340b from the input image signal $D_{Bm}(n)$ or $D_{Rm}(n)$ has the same operational characteristic as that of the subtractor 430 according to the embodiment of the present invention discussed above with regard to FIG. 14. The LPF1 includes the first delayer (1HDL) 320, the second delayer (1HDL) 330, the second adder 340a, the half-subtractor 340b, and a third adder 350. The third adder 350 adds the input image signal $D_{Bm}(n)$ or $D_{Rm}(n)$ to an output signal of the half-subtractor 340b.

In addition, a bright signal $D_m^4(n)$ output from the first adder 530 is input to a gamma converter 84 via a horizontal contour compensator (540 and 550) including a second BPF (BPF2) 540 and a fourth adder 550. The bright signal $D_m^4(n)$ is input from the first adder 530 to the BPF2 540. The fourth adder 550 adds an output signal of the BPF2 540 to the bright signal $D_m^4(n)$ output from the first adder 530. Accordingly, compensation of a horizontal contour can be performed. Furthermore, a bright signal output from the fourth adder 550 is input to the gamma converter 84 via a vertical contour compensator (560, 570, and 580) including a third subtractor 560, a seventh LPF (LPF7) 570, and a fifth adder 580.

The third subtractor 560 subtracts the output signal of the half-subtractor 340b from the input image signal $D_{Bm}(n)$ or $D_{Rm}(n)$. The LPF7 570 cancels a high frequency component of chrominance signals contained in an output signal of the third subtractor 560. The fifth adder 580 adds an output signal of the LPF7 570 to the bright signal output from the fourth adder 550. Accordingly, compensation of a vertical contour can be performed.

It should also be noted that the embodiments of the present invention described herein can be used to all application fields of an image signal processing apparatus generating a bright signal.

As described above, if a pixel position of an input image signal is within an object range, a normal high frequency component is contained in a bright signal of the input image signal. This normal high frequency component is canceled together with a high frequency component of chrominance signals by an LPF. However, the canceled normal high frequency component of the bright signal is compensated by a bright signal controller.

Thus, according to the embodiments of the present invention, regardless of cancelling the abnormal high frequency component of the chrominance signals in the LPF, the normal high frequency component of the bright signal generated within the object range can be preserved. Thus, image reproducibility can be enhanced.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An image signal processing apparatus for processing an image signal input from an analog-to-digital converter (ADC) in a pixel-by-pixel basis and generating a bright signal corresponding to chrominance signals, the image signal processing apparatus comprising:

a low pass filter (LPF) for canceling a high frequency component of the chrominance signals contained in the input image signal;

a subtractor for generating a high frequency component signal by subtracting an output signal of the LPF from the input image signal;

an adder for generating the bright signal by adding the high frequency component signal generated by the subtractor to the output signal of the LPF; and a bright signal controller for increasing the high frequency component signal generated by the subtractor for a pixel position if the value of the pixel position of the input image signal to the LPF is within an object range, and decreasing the high frequency component signal generated by the subtractor for the pixel position if the value of the pixel position of the input image signal to the LPF is out of the object range.

2. The image signal processing apparatus of claim 1, further comprising a gamma converter for performing gamma conversion of a bright signal output from the adder in order to previously compensate for an inverse gamma bright characteristic of a cathode ray tube.

3. The image signal processing apparatus of claim 1, wherein the bright signal controller comprises:

a horizontal width determiner which outputs a binary signal "1" if a pixel position of the input image signal is within a horizontal object width, and which otherwise outputs a binary signal "0";

a gradation similarity measurement unit for generating a gradation similarity signal, which is a ratio of a gradation of the input image signal approximate to a mean gradation in a horizontal direction;

a first multiplier for multiplying an output signal of the horizontal width determiner by the gradation similarity signal output from the gradation similarity measurement unit;

a vertical width determiner which outputs a binary signal "1" if a pixel position of the input image signal is within a vertical object width, and which otherwise outputs a binary signal "0";

a second multiplier for multiplying an output signal of the first multiplier by an output signal of the vertical width determiner; and a third multiplier for multiplying the high frequency component signal output from the subtractor by an output signal of the second multiplier and outputting a high frequency component signal that is the multiplication result to the adder.

4. The image signal processing apparatus of claim 3, wherein the horizontal width determiner comprises:

a band pass filter (BPF) for detecting two edges in the horizontal direction;

an absolute value generator for generating an absolute value of an output of the BPF;

a median filter which outputs a binary signal "1" if an absolute value of the input image signal that is output from the absolute value generator is between the two edges in the horizontal direction, and which otherwise outputs a binary signal "0"; and a minimum value filter for reducing a horizontal area occupied by each of the two edges of the median filter.

5. The image signal processing apparatus of claim 3, wherein the vertical width determiner comprises:

a vertical edge detector for detecting two edges in the vertical direction;

a second LPF (LPF2) for canceling a high frequency component of the chrominance signals contained in the input image signal;

an absolute value generator for generating an absolute value of an output of the LPF2;

a third LPF (LPF3) which outputs a binary signal "1" if the absolute value of the output signal of the absolute value generator is between the two edges in the vertical direction, and which otherwise outputs a binary signal "0".

6. The image signal processing apparatus of claim 5, wherein the vertical edge detector comprises:

an adder for adding the input image signals of the first adjacent pixel and the second adjacent pixel located at the both edges of the pixel of the input image signal in the vertical direction;

a half-subtractor for subtracting an output of the adder to a half; and a subtractor for subtracting an output of the half-subtractor from the input image signal.

7. An image signal processing apparatus for processing an image signal $D_{Bm}(n)$ or $D_{Rm}(n)$ input from an analog-to-digital converter (ADC) in a pixel-by-pixel basis and generating a bright signal $YL_m(n)$ corresponding to chrominance signals, the image signal processing apparatus comprising:

a first low pass filter (LPF1) for canceling an abnormal frequency component of the chrominance signals contained in the input image signal $D_{Bm}(n)$ or $D_{Rm}(n)$;

a second LPF (LPF2) for canceling a high frequency component of the input image signal $D_{Bm}(n)$ or $D_{Rm}(n)$ in the vertical direction;

a fifth LPF (LPF5) for canceling a high frequency component of chrominance signals contained in a signal $D_m^0(n)$ output from the LPF2;

a first subtractor for generating a high frequency component signal $D_m^0(n)$ by subtracting an output signal $D_m^1(n)$ of the LPF5 from the signal $D_m^0(n)$ output from the LPF2;

a first adder for generating the bright signal $YL_m(n)$ by adding the high frequency component signal $D_m^2(n)$ generated by the first subtractor to an output signal $D_m^3(n)$ of the LPF1; and a bright signal controller for increasing the high frequency component signal $D_m^2(n)$ generated by the first subtractor for a pixel position if the value of the pixel position of the input image signal $D_{Bm}(n)$ or $D_{Rm}(n)$ is within an object range, and decreasing the high frequency component signal $D_m^2(n)$ generated by the first subtractor for the pixel position if the value of the pixel position of the input image signal $D_{Bm}(n)$ or $D_{Rm}(n)$ is out of the object range.

8. The image signal processing apparatus of claim 7, further comprising a gamma converter performing gamma conversion of a bright signal $D_m^4(n)$ output from the first adder in order to previously compensate for an inverse gamma bright characteristic of a cathode ray tube.

9. The image signal processing apparatus of claim 8, wherein the bright signal controller comprises:

a horizontal width determiner which outputs a binary signal "1" if a pixel position of the input image signal $D_{Bm}(n)$ or $D_{Rm}(n)$ is within a horizontal object width, and which otherwise outputs a binary signal "0";

a gradation similarity measurement unit for generating a gradation similarity signal $P_m^1(n)$, which is a ratio of a gradation of the input image signal $D_{Bm}(n)$ or $D_{Rm}(n)$ approximate to a mean gradation in the horizontal direction;

a first multiplier for multiplying an output signal of the horizontal width determiner by the gradation similarity signal $P_m^1(n)$ output from the gradation similarity measurement unit;

a vertical width determiner which outputs a binary signal "1" if a pixel position of the input image signal $D_{Bm}(n)$ or $D_{Rm}(n)$ is within a vertical object width, and which otherwise outputs a binary signal "0";

a second multiplier for multiplying an output signal of the first multiplier by an output signal $P_m^2(n)$ of the vertical width determiner; and a third multiplier for multiplying the high frequency component signal $D_m^2(n)$ output from the first subtractor by an output signal $P_m^3(n)$ of the second multiplier and outputting a high frequency component signal that is the multiplication result to the first adder.

10. The image signal processing apparatus of claim 9, wherein the horizontal width determiner comprises:

a band pass filter (BPF) for detecting two edges in the horizontal direction;

an absolute value generator for generating an absolute value of an output of the BPF;

a median filter which outputs a binary signal "1" if an absolute value of the input image signal that is output from the absolute value generator is between the two edges in the horizontal direction, and which otherwise outputs a binary signal "0"; and a minimum value filter for reducing a horizontal area occupied by each of the two edges of the median filter.

11. The image signal processing apparatus of claim 9, wherein the gradation similarity measurement unit comprises:

a sixth LPF (LPF6) for canceling the high frequency component of the chrominance signals contained in the output signal $D_m^3(n)$ of the LPF1;

a mean level calculator for calculating a mean gradation of the pixel position of the input image signal $D_{Bm}(n)$ or $D_{Rm}(n)$ in the horizontal direction; and a level converter for generating the gradation similarity signal $P_m^1(n)$, which is a ratio of a gradation output from the LPF6 approximate to the mean gradation output from the mean level calculator.

12. The image signal processing apparatus of claim 9, wherein the vertical width determiner comprises:

a vertical edge detector for detecting two edges in the vertical direction;

a third LPF (LPF3) for canceling a high frequency component of the chrominance signals contained in an output signal of the vertical edge detector;

an absolute value generator for generating an absolute value of an output of the LPF3;

a fourth LPF (LPF4) which outputs a binary signal "1" if the absolute value of the output signal of the absolute value generator is between the two edges in the vertical direction, and which otherwise outputs a binary signal "0".

13. The image signal processing apparatus of claim 12, wherein the vertical edge detector comprises:

a first delayer and a second delayer for obtaining the input image signals of the first adjacent pixel and the second adjacent pixel located at the both edges of the pixel of the input image signal $D_{Bm}(n)$ or $D_{Rm}(n)$ in the vertical direction;

a second adder for adding the input image signals of the first adjacent pixel and the second adjacent pixel;

a half-subtractor for subtracting an output of the adder to a half; and a second subtractor for subtracting an output of the half-subtractor from the input image signal $D_{Bm}(n)$ or $D_{Rm}(n)$.

14. The image signal processing apparatus of claim 13, wherein the LPF1 comprises:
the first delayer;
the second delayer;
the second adder;
the half-subtractor; and
a third adder adding the input image signal $D_{Bm}(n)$ or $D_{Rm}(n)$ to the output of the half-subtractor.

15. The image signal processing apparatus of claim 13, wherein the bright signal $D_m^4(n)$ output from the first adder is input to the gamma converter via a horizontal contour compensator.

16. The image signal processing apparatus of claim 15, wherein the horizontal contour compensator comprises:
a second BPF (BPF2) for receiving a bright signal $D_m^4(n)$ from the first adder; and
a fourth adder for adding an output signal of the BPF2 to the bright signal $D_m^4(n)$ output from the first adder.

17. The image signal processing apparatus of claim 16, wherein a bright signal output from the fourth adder is input to the gamma converter via a vertical contour compensator.

18. The image signal processing apparatus of claim 17, wherein the vertical contour compensator comprises:
a third subtractor for subtracting the output signal of the half-subtractor from the input image signal $D_{Bm}(n)$ or $D_{Rm}(n)$;
a seventh LPF (LPF7) for canceling a high frequency component of chrominance signals contained in an output signal of the third subtractor; and
a fifth adder for adding an output signal of the LPF7 to the bright signal output from the fourth adder.

19. A method for processing an image signal input from an analog-to-digital converter (ADC) in a pixel-by-pixel basis and generating a bright signal corresponding to chrominance signals, the method comprising:
canceling a high frequency component of the chrominance signals contained in the input image signal and providing a modified input image signal;
generating a high frequency component signal by subtracting the modified input image signal from the input image signal;
generating the bright signal by adding the high frequency component signal to the modified input image signal; and
increasing the high frequency component signal of a pixel position if the value of the pixel position of the input image signal is within an object range, and decreasing the high frequency component signal of the pixel position if the value of the pixel position of the input image signal is out of the object range.

20. A method for processing an image signal $D_{Bm}(n)$ or $D_{Rm}(n)$ input from an analog-to-digital converter (ADC) in a pixel-by-pixel basis and generating a bright signal $YL_m(n)$ corresponding to chrominance signals, the method comprising:
canceling an abnormal frequency component of the chrominance signals contained in the input image signal $D_{Bm}(n)$ or $D_{Rm}(n)$ and outputting a signal $D_m^3(n)$;
canceling a high frequency component of the input image signal $D_{Bm}(n)$ or $D_{Rm}(n)$ in the vertical direction to output a signal $D_m^0(n)$;
canceling a high frequency component of chrominance signals contained in the signal $D_m^0(n)$ and outputting a signal $D_m^1(n)$;
generating a high frequency component signal $D_m^2(n)$ by subtracting the signal $D_m^1(n)$ from the signal $D_m^0(n)$;
generating the bright signal $YL_m(n)$ by adding the high frequency component signal $D_m^2(n)$ to the signal $D_m^3(n)$; and
increasing the high frequency component signal $D_m^2(n)$ of a pixel position if the value of the pixel position of the input image signal $D_{Bm}(n)$ or $D_{Rm}(n)$ to be the signal $D_m^3(n)$ is within an object range, and decreasing the high frequency component signal $D_m^2(n)$ of the pixel position if the value of the pixel position of the input image signal $D_{Bm}(n)$ or $D_{Rm}(n)$ to be the signal $D_m^3(n)$ is out of the object range.

* * * * *